United States Patent [19]

Carlson et al.

[11] 4,190,028

[45] Feb. 26, 1980

[54] MIXTURE FORMING ASSEMBLY FOR CLOSED LOOP AIR-FUEL METERING SYSTEM

[75] Inventors: Clifford R. Carlson, Fenton; Alan F. Chiesa, Sterling Heights, both of Mich.

[73] Assignee: General Motors Corporation, Detroit, Mich.

[21] Appl. No.: 927,504

[22] Filed: Jul. 24, 1978

[51] Int. Cl.² .................... F02M 23/04; F02M 21/02
[52] U.S. Cl. .................... 123/119 EC; 123/119 R; 261/121 B; 261/69 R
[58] Field of Search .................... 123/119 R, 119 EC; 261/69 R, 121 B, 50 R, DIG. 74

[56] References Cited

U.S. PATENT DOCUMENTS

| 3,936,516 | 2/1976 | Nakagawa | 261/121 B |
| 4,091,780 | 5/1978 | Masaki | 123/119 R |
| 4,135,482 | 5/1976 | Bier et al. | 123/119 EC |

Primary Examiner—Ronald H. Lazarus
Attorney, Agent, or Firm—C. K. Veenstra

[57] ABSTRACT

The idle and main fuel passages of a carburetor are controlled by metering apparatus which is regulated to maintain the idle and part throttle air-fuel mixtures at a selected air-fuel ratio, but during low temperature engine operating conditions the part throttle mixture is leaner than the idle mixture in any particular regulated mode of the metering apparatus. This invention provides a mixture forming assembly which further includes means for leaning the idle mixture only during such low temperature operating conditions; the metering apparatus is then regulated to a rich mode at idle during low temperature engine operating conditions to provide an idle mixture which is leaned to the selected air-fuel ratio, and a lean part throttle mixture is avoided as the throttle is opened from idle to a part throttle position.

3 Claims, 1 Drawing Figure

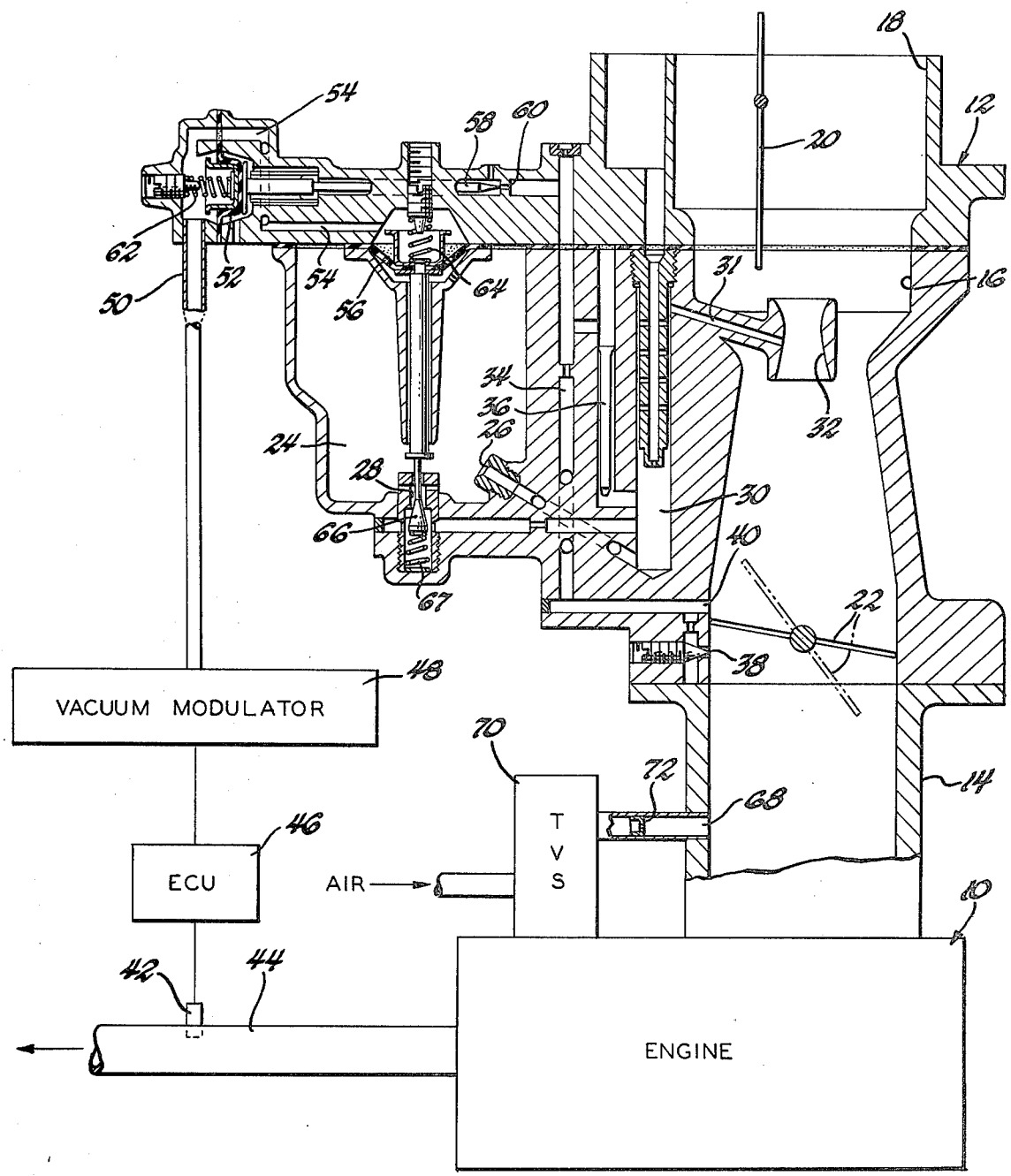

MIXTURE FORMING ASSEMBLY FOR CLOSED LOOP AIR-FUEL METERING SYSTEM

This invention relates to an air-fuel mixture forming assembly for use in an engine closed loop air-fuel metering system.

Several air-fuel mixture forming carburetors have been proposed for use on engines having means for measuring the air-fuel ratio of the mixture formed by the carburetors. In general, the carburetors contain metering apparatus which is regulated by the measuring means to maintain the idle and/or part throttle mixtures at a selected air-fuel ratio. In one such carburetor, it was discovered that the air-fuel ratio of the part throttle mixture was leaner than the air-fuel ratio of the idle mixture during low temperature engine operating conditions in any particular regulated mode of the metering apparatus. Thus as the throttle was opened from idle to a part throttle position, an undesirable lean part throttle mixture was momentarily encountered.

This invention provides an air-fuel mixture forming assembly which has metering apparatus that is regulated to maintain both the idle and part throttle mixtures at a selected air-fuel ratio and which includes means for leaning the idle mixture during low temperature engine operating conditions. The metering apparatus accordingly is regulated to a rich mode during low temperature engine operating conditions at idle, and a lean part throttle mixture is avoided as the throttle is opened from idle to a part throttle position.

The details as well as other features and advantages of this invention are set forth in the remainder of the specification and are shown in the drawing in which the sole FIGURE is a schematic view of an air-fuel mixture forming assembly employing this invention.

Referring to the drawing, an internal combustion engine 10 has an air-fuel mixture forming assembly including a carburetor 12 and an intake manifold 14. An induction passage 16 has a main air inlet 18 and extends through carburetor 12 and manifold 14 to engine 10.

A conventional choke 20 and throttle 22 are disposed in induction passage 16. The idle position of throttle 22 is shown by solid lines and a part throttle position by broken lines.

Within carburetor 12, a fuel bowl 24 delivers fuel through a primary main metering orifice 26 and an auxiliary main metering orifice 28 to a main well 30 which discharges through a main fuel passage 31 into a venturi 32 disposed in induction passage 16; fuel discharged into venturi 32 mixes with air in induction passage 16 to form a part throttle air-fuel mixture. An idle fuel passage 34 has a pick-up tube 36 receiving fuel from well 30 and discharges through a curb idle port 38 opening to induction passage 16; fuel discharged through port 38 mixes with air in induction passage 16 to form an idle air-fuel mixture. Fuel is also discharged from idle passage 34 through an off-idle port 40 to provide a smooth transition from the idle system to the main system.

A sensor 42 is disposed in the exhaust system 44 of engine 10 to measure the exhaust gas composition and thus measure the air-fuel ratio of the mixture delivered to engine 10. The output of sensor 42 is received by an electronic control unit 46 which operates a vacuum modulator 48 to provide a controlled vacuum signal through a fitting 50 to carburetor 12. The vacuum signal in fitting 50 is sensed by an idle control diaphragm 52 and, through a passage 54, by main control diaphragm 56.

Idle diaphragm 52 is connected to an idle air bleed valve 58 which controls air flow through an idle air bleed orifice 60 into idle fuel passage 34. As the vacuum signal in fitting 50 increases (i.e., as the pressure decreases), diaphragm 52 is retracted leftwardly against the bias of a spring 62 to increase the air flow through bleed orifice 60; increased air flow through bleed orifice 60 decreases fuel flow through idle fuel passage 34 to lean the idle air-fuel mixture.

Main diaphragm 56 is connected to a main metering valve 66 which controls fuel flow through auxiliary main metering orifice 28. As the vacuum signal in fitting 50 increases, diaphragm 56 is retracted upwardly against the bias of a spring 64 and allows a spring 67 to lift metering valve 66 into auxiliary main metering orifice 28. This action reduces fuel flow through orifice 28 and main fuel passage 31 to lean the part throttle air-fuel mixture.

Thus both the idle and the part throttle mixtures are leaned upon an increase in the vacuum signal provided by modulator 48, and conversely both the idle and the part throttle mixtures are richened upon a decrease in the vacuum signal. Accordingly, electronic control unit 46 causes modulator 48 to increase the vacuum signal and lean the mixture when the mixture sensed by sensor 42 is richer than a selected air-fuel ratio and to decrease the vacuum signal and richen the mixture when the mixture is leaner than the selected air-fuel ratio. The metering apparatus formed by bleed valve 58 and metering valve 66 accordingly is regulated between a lean position or mode causing restriction of fuel delivery through the idle and main fuel passages and a rich position or mode (illustrated in the drawing) permitting increased fuel delivery through such passages and is regulated by sensor 42 to maintain the idle and part throttle mixtures at the selected air-fuel ratio.

During operation, each value of the vacuum signal in fitting 50 places the metering apparatus (bleed valve 58 and metering valve 66) in a particular regulated position or mode. However, during certain engine operating conditions, such as when the engine coolant temperature is below 150° F., for example, the part throttle mixture may be leaner than the idle mixture for any particular regulated mode of the metering apparatus. As throttle 22 is opened from idle to a part throttle position, sufficient time must pass for the air-fuel mixture to flow through intake manifold 14, engine 10 and exhaust system 44 and for sensor 42, electronic control unit 46, vacuum modulator 48, and diaphragm 56 to reposition metering valve 66 before the fuel flow through main fuel passage 31 may be increased to return the air-fuel ratio of the part throttle mixture to the selected air-fuel ratio at which the idle mixture was maintained during idle operation. Thus an undesirable lean part throttle mixture may be momentarily encountered.

To avoid such a lean part throttle mixture, this invention provides induction passage 16 with an auxiliary air inlet 68 disposed in intake manifold 14. Auxiliary air inlet 68 receives air through a thermal valve switch 70 which is responsive to the temperature of the engine coolant; thermal valve switch 70 permits flow through auxiliary air inlet 68 during engine operating conditions below 150° F. and obstructs flow through auxiliary air inlet 68 during engine operating conditions above 150° F.

A restriction 72 disposed in inlet 68 is sized to permit sufficient air flow through inlet 68 to lean the idle mixture delivered by carburetor 12 to the selected air-fuel ratio while limiting air flow through inlet 68 to reduce the effect of that air flow on the part throttle mixture. Thus with the throttle in the idle position and engine temperature below 150° F., a low vacuum signal is provided through fitting 50 which causes springs 62 and 64 to advance diaphragms 52 and 56 to a rich position or mode wherein bleed valve 58 restricts air flow through orifice 60 and metering valve 66 permits increased fuel flow through auxiliary main metering orifice 28; carburetor 12 accordingly, provides a rich idle mixture which is leaned by air flow through auxiliary air inlet 68 to the selected air-fuel ratio. As the throttle is opened to a part throttle position, air flow through auxiliary air inlet 68 becomes less effective in leaning the increased flow of air-fuel mixture from carburetor 12; vacuum modulator 48 then increases the vacuum signal provided through fitting 50 to retract diaphragm 56 toward a lean position or mode, and metering valve 66 is moved into auxiliary main metering orifice 28 so that the part throttle mixture delivered by carburetor 12 is leaned and a mixture of the selected air-fuel ratio is created.

This air-fuel mixture forming assembly accordingly causes the metering apparatus to operate in a rich mode with the throttle in the idle position and in a leaner mode with the throttle in a part throttle position and thus avoids a lean part throttle mixture as throttle 22 is opened from idle to a part throttle position.

It will be appreciated that this invention may be employed in other embodiments. For example, the idle mixture may be leaned by providing a controlled auxiliary air bleed into idle fuel passage 34 in place of auxiliary air inlet 68. Moreover, this invention may be employed if the part throttle mixture is leaner than the idle mixture in a particular regulated mode of the metering apparatus during engine operating conditions other than low temperature by appropriate control of such an auxiliary air bleed or auxiliary air inlet.

The embodiments of the invention in which an exclusive property or privilege is claimed are defined as follows:

1. In an engine having means for measuring the air-fuel ratio of the air-fuel mixture delivered to the engine, an air-fuel mixture forming assembly comprising an induction passage having an air inlet, a throttle disposed in said induction passage and movable between idle and part throttle positions for controlling flow therethrough, idle and main fuel passages opening to said induction passage for delivering fuel thereto when said throttle is in said idle and part throttle positions respectively to thereby form idle and part throttle air-fuel mixtures therein, and metering apparatus controlling fuel flow through said fuel passages and regulated between a lean mode causing restriction of fuel flow through said passages and a rich mode permitting increased fuel flow through said passages, said metering apparatus being regulated by said measuring means to maintain the idle and part throttle mixtures at a selected air-fuel ratio, wherein the part throttle mixture is leaner than the idle mixture in a particular regulated mode of said metering apparatus during certain engine operating conditions, and wherein said assembly further comprises means for leaning the idle mixture only during said certain engine operating conditions to thereby cause said measuring means to regulate said metering apparatus to said rich mode, whereby said metering apparatus is regulated to said rich mode as said throttle is moved from said idle position to said part throttle position and a lean part throttle mixture is avoided during said certain engine operating conditions.

2. In an engine having means for measuring the air-fuel ratio of the air-fuel mixture delivered to the engine, an air-fuel mixture forming assembly comprising an induction passage having a main air inlet, a throttle disposed in said induction passage and movable between idle and part throttle positions for controlling flow therethrough, idle and main fuel passages delivering fuel to said induction passage when said throttle is in said idle and part throttle positions respectively to thereby form idle and part throttle air-fuel mixtures respectively, and metering apparatus controlling fuel delivery through said fuel passges and regulated between a lean mode causing restriction of fuel delivery through said passages and a rich mode permitting increased fuel delivery through said passages, said metering apparatus being regulated by said measuring means to maintain the main and idle mixtures at a selected air-fuel ratio, wherein the main mixture is leaner than the idle mixture in a particular regulated mode of said metering apparatus during certain engine operating conditions, wherein said induction passage also has an auxiliary air inlet receiving a restricted air flow for leaning the idle mixture to thereby cause said measuring means to regulate said metering apparatus to said rich mode, and wherein said assembly further comprises means for inhibiting air flow through said auxiliary air inlet during other engine operating conditions, whereby said metering apparatus is regulated to said rich mode as said throttle is moved from said idle position to said part throttle position and a lean part throttle mixture is avoided during said certain engine operating conditions.

3. In an engine having means for measuring the air-fuel ratio of the air-fuel mixture delivered to the engine, an air-fuel mixture forming assembly comprising an induction passage having a main air inlet, a throttle disposed in said induction passage and movable between idle and part throttle positions for controlling flow therethrough, idle and main fuel passages delivering fuel to said induction passage when said throttle is in said idle and part throttle positions respectively to thereby form idle and part throttle air-fuel mixtures respectively, and metering apparatus controlling fuel delivery through said fuel passages and regulated between a lean mode causing restriction of fuel delivery through said passages and a rich mode permitting increased fuel delivery through said passages, said metering apparatus being regulated by said measuring means to maintain the idle and part throttle mixtures at a selected air-fuel ratio, wherein the main mixture is leaner than the idle mixture in a particular regulated mode of said metering apparatus during engine operation below a certain temperature, wherein said induction passage also has an auxiliary air inlet receiving a restricted air flow for leaning the idle mixture to thereby cause said measuring means to regulate said metering apparatus to said rich mode, and wherein said assembly further comprises means for inhibiting air flow through said auxiliary air inlet during engine operation above said certain temperature, whereby said metering apparatus is regulated to said rich mode as said throttle is moved from said idle position to said part throttle position and a lean part throttle mixture is avoided during engine operation below said certain temperature.

* * * * *